(12) United States Patent
Carlson (10) Patent No.: US 6,377,959 B1
(45) Date of Patent: Apr. 23, 2002

(54) REDUNDANT DATABASE RECOVERY THROUGH CONCURRENT UPDATE AND COPY PROCEDURES

(75) Inventor: Wayne Charles Carlson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 08/650,397

(22) Filed: May 20, 1996

Related U.S. Application Data

(63) Continuation of application No. 08/215,447, filed on Mar. 18, 1994, now abandoned.

(51) Int. Cl.⁷ .............................................. G06F 17/30
(52) U.S. Cl. ...................................................... 707/202
(58) Field of Search ................................ 707/202, 204, 707/8, 10

(56) References Cited

U.S. PATENT DOCUMENTS

| | | | | |
|---|---|---|---|---|
| 4,751,702 A | * | 6/1988 | Beier et al. | 707/202 |
| 4,878,167 A | | 10/1989 | Kapulka et al. | 364/200 |
| 4,945,474 A | | 7/1990 | Elliott et al. | 364/200 |

(List continued on next page.)

FOREIGN PATENT DOCUMENTS

| | | | | |
|---|---|---|---|---|
| DE | 0 586 907 A1 | 8/1993 | ............. | G06F/9/44 |
| EP | 0 516 900 A1 | 4/1991 | ............ | G06F/11/14 |
| WO | PCT/US85/01279 | 2/1986 | ............ | G06F/11/14 |

OTHER PUBLICATIONS

D. Patterson et al. "Intro. to Redundant Arrays of Inexpensive Disks (RAID)" COMPCON Spring '89 IEEE Comp. Soc. Int'l Conf. pp. 112–117, 1989.*

M. Singhal "A Fully–Distributed Approach to Concurrency Control in Replicated Database Systems" 1988 IEEE COMPSAC, pp. 353–360, 1988.*

J. Chandy et al. "Failure Evaluation of Disk Array Organizations" Dist. Comp. Syst. 1993 IEEE Int'l Conf., pp. 319–326, 1993.*

A. Mourad et al. "Database Recovery Using Redundant Disk Arrays" Data Engineering, 1992 IEEE 8th Int'l Conf., pp. 176–183, 1992.*

European Search Report, Communication, Jul. 17, 1995 EP95 30 0487, 3 pages.

*Primary Examiner*—Jack Choules
(74) *Attorney, Agent, or Firm*—Dan Hubert & Assoc.

(57) ABSTRACT

A transaction processing system that continues to process incoming transactions during the failure and recovery of either of two duplicate databases. One of the two duplicate databases is assigned "active" status and the other is maintained with "redundant" status. All incoming queries are sent only to the active database and all incoming updates are sent to both active and redundant databases. When one database fails, the other is immediately reassigned active status if not already active and continues to process incoming queries and updates during the failure. When the failed database is repaired and restarted, all records are flushed therefrom and the failed database is reconstructed using interleaved copy and update operations in a single pass through the active database. Incoming transaction and copy operations are interleaved according to a queue thresholding method for throttling copy operations responsive to increased numbers of incoming transactions. The transaction processing system remains operational both during the failure and during the recovery activities and reaches full recovery without downtime.

23 Claims, 12 Drawing Sheets

U.S. PATENT DOCUMENTS

| | | | |
|---|---|---|---|
| 5,019,963 A | 5/1991 | Alderson et al. | 364/200 |
| 5,043,871 A | 8/1991 | Nishigaki et al. | 364/200 |
| 5,060,185 A * | 10/1991 | Naito et al. | 707/202 |
| 5,163,148 A | 11/1992 | Walls | 395/600 |
| 5,170,480 A | 12/1992 | Mohan et al. | 395/600 |
| 5,313,664 A * | 5/1994 | Sugiyama et al. | 705/21 |
| 5,321,832 A * | 6/1994 | Tanaka et al. | 395/600 |
| 5,331,646 A * | 7/1994 | Kraeger et al. | 371/40.1 |
| 5,355,477 A * | 10/1994 | Strickland et al. | 707/8 |
| 5,432,922 A * | 7/1995 | Polyzois et al. | 395/425 |

* cited by examiner

REDUNDANT DATABASE RECOVERY THROUGH CONCURRENT UPDATE AND COPY PROCEDURES

This application is a continuation of application Ser. No. 08/215,447, filed Mar. 18, 1994, now abandoned.

BACKGROUND OF THE INVENTION

1. Field of the Invention

This invention relates generally to database recovery procedures and specifically to a dual database system that employs concurrent copy and update operations to recover from failure of either database without interrupting availability of the other database.

2. Discussion of the Related Art

An integral part of any database system is a recovery scheme for the detection of failures and the restoration of the database to a consistent state. A "transaction" is a logical unit of work referencing a sequence of queries (reads) and updates (writes, including deletes, inserts, and changes) that transforms a consistent state of a recoverable resource into another consistent state without necessarily preserving consistency at all intermediate points. For the purposes of this discussion, a database is considered as a typical instance of such a recoverable source.

Transactions are executed on computer-implemented database processing systems that may be considered to operate in several modes, including a "processing" mode and, in the event of failure, one or more "recovery" modes. The existing art is replete with examples of fault-tolerant, transaction-oriented database processing systems, including checkpoint and incremental recovery log systems, shadow-paging systems and redundant database systems.

The redundant database systems known in the art are exemplified by the system disclosed in U.S. Pat. No. 5,170,480 issued to Mohan et al. who disclose a synchronous distributed database system that provides for storing a consistent copy of a database in two locations. Mohan et al. teach the use of a tracking system that operates in conjunction with an "active" database system to maintain a "tracking" database in a second redundant database system, where the tracking database is a replica of the active database maintained in the active database system. The transaction log redo records are organized into queues representing separate units of transfer (pages) before transmission from the active database system to the redundant database system, thereby more efficiently maintaining tracking database consistency. Their dual database system permits updating of the active database even when the tracking database is not available and eliminates the usual requirement for independent serialization of redundant database system operations.

When failure occurs in the active database system of a dual database system such as that described by Mohan et al., a redundant database is available as a checkpoint for recovery of the active database in conjunction with the usual transaction log forward recovery procedures known in the art. Unfortunately, neither database is available for active use during such a recovery. Moreover, if one of the two database systems is down for a significant period of time, the size of the forward recovery transaction log necessary for recovering the failed database can grow to unacceptably large size. This is because the forward recovery log must maintain a record of all transactions occurring during the failure period, which are then applied to the recovered consistent database to bring it up to a concurrent consistent state. Alternatively, a failed database can be recovered merely by making a new copy of the redundant database following repair of the active database system failure. However, when the redundant database is remotely located from a very large active database, the mechanics of copying the entire database to the remote location may present unacceptable difficulties. For instance, to ensure consistency, the active database must normally be locked until completion of the database copying process. Thus, all incoming transactions must be accumulated until the active database is unlocked and this accumulation may reach unacceptably large size.

Practitioners have proposed solutions to these problems with only limited success. For instance, in European patent EP-51690-A, Baker et al. disclose an invention that permits a backup to be taken of a nonredundant database while that database remains open for transaction processing by frequently recording a complete set of tie-up records in the transaction log. The tie-up records provide sufficient data to recover a checkpoint database copy, and the high checkpoint frequency permits recovery from a relatively small log upon failure. Thus, Baker et al. do not avoid the usual database system suspension during forward recovery upon failure. Although Baker et al. show how to avoid suspending database operation during checkpoint backup copying, the dual database system also solves this problem by continuously maintaining the redundant database.

Accordingly, there is a clearly-felt need in the art for a dual database system that maintains two databases with identical entries for fault tolerance, where the "active" database is always available during and after system failures. Such a system must permit failure repair without interrupting system operation and must also provide means for recreating the failed backup database following repair without interrupting system operation. That is, the "active" database must remain available for normal system queries and updates while the "redundant" database is being recreated following repair of a system failure. The recreated "redundant" database must reflect all intervening updates made to the active database during recovery, thereby arriving at a concurrent consistent state following such recovery.

The usual practice known in the art for forward recovery from an earlier consistent (checkpoint) database copy using a log of subsequent transactions cannot solve these problems. First, if the failed database is down too long, the forward recovery log becomes too large to permit recovery of a current consistent database from the earlier checkpoint copy. Secondly, incoming transactions cannot be processed during forward recovery and must be accumulated, making the necessary forward recovery log even larger. Finally, if the forward recovery log is frozen, then the entire database system must be halted during forward recovery, which interrupts continuous availability.

These unresolved problems and deficiencies are clearly felt in the art and are solved by this invention in the manner described below.

SUMMARY OF THE INVENTION

This invention provides a continuously-available fault-tolerant database by combining the copy operations necessary to reconstruct a failed database with the database transaction operations incoming during recovery. Thus, the "active" (surviving) database system copies one record at a time while interleaving updates into the operation stream at the "redundant" (recovering) database system. These concurrent redundant database system operations are queued and interleaved with the normal active database transaction processing operations according to a queue thresholding test. When the copying completes, the redundant database is fully recovered into a concurrently consistent state and the continuing (echoed) incoming update operations in the redundant database system serve to maintain the concurrent consistency of the redundant database until another failure occurs. This invention requires interchangeability of the operating status (active or redundant) of each of two database systems and identifiability of each database record by some unique Record Identification Key (RIK).

It is an object of this invention to provide a dual database transaction processing system that is continuously available during recovery from the failure of either of two database processing systems. It is an advantage of the system of this invention that transaction processing activities can be continued uninterrupted during the failure of either database system and also during recovery of the failed database.

It is another objective of the system of this invention to minimize requisite transaction log size and complexity. It is a feature of the dual database system of this invention that transaction log entries are required only during the failure of either database and are then required only to back up the remaining active database during failure and recovery of the second database. Otherwise, no transaction log is necessary.

The foregoing, together with other objects, features and advantages of this invention, will become more apparent when referring to the following specification, claims and accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
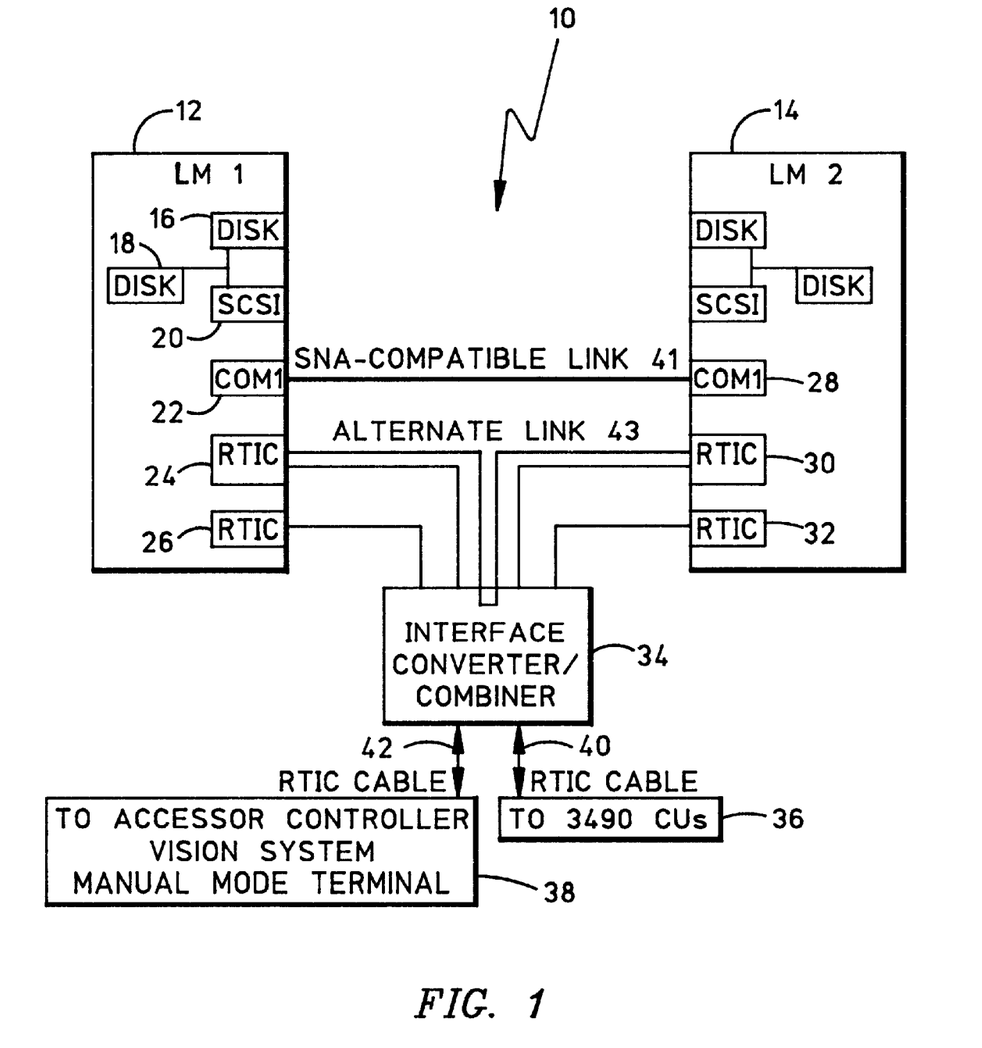
FIG. 1 shows a functional block diagram of an exemplary embodiment of the dual database system of this invention.

FIG. 1 provides a schematic functional illustration of an exemplary embodiment of the dual database system 10 of this invention. Dual database system 10 serves a data storage library by the tracking volume data and includes two identical library managers 12 and 14. Library manager 12 exemplifies a transaction processing system or database system that includes a library volume database stored in a storage system including the disks 16 and 18, data communications hardware such as the SCSI controller 20, the COM port controller 22 and the RTIC controllers 24 and 26. Library manager 14 is physically identical to library manager 12 as shown in FIG. 1. Library managers 12 and 14 are interconnected through a SNA-compatible link 41 for direct communications between COM port controllers 22 and 28. The RTIC controllers 24, 26, 30 and 32 are configured to use RS-422 data protocol with 3-state control of the drivers (not shown). The alternate link 43 employs an RS-232 port (not shown) on the RTIC controller. Link 43 is wired in much the same way as SNA-compatible link 41, with drivers on one side connected to receivers on the other in "null-modem" fashion to avoid driver conflicts. The RS-422 (with 3-state control) connections to the external devices 36 and 38 provide connectivity from both library managers 12 and 14.

Both library managers 12 and 14 are coupled by their RTIC data links to the interface converter/combiner circuit 34. Circuit 34 then is coupled to two external library groups to provide database processing services thereto. In the exemplary embodiment shown in FIG. 1, these two groups include a group of IBM 3490 data storage library control units, shown as the group 36 in FIG. 1. Another group 38 includes the accessor controller, vision system and manual mode terminal elements associated with the automated magnetic tape subsystem systems such as the IBM 3495 tape library server. Cable 40 carries a stream of commands and responses including some for the host that are passed on by circuit 36. Other commands are generated by the "active" library manager 12 or 14. Cable 42 carries robotic and vision system commands and responses, as well as terminal data. The database transactions are generated internally by the active library manager 12 or 14 while executing host requests and controlling the robotic system. For the purposes of this disclosure, these functional details of groups 36 and 38 are irrelevant except that they provide a stream of (library volume) commands along the RTIC cables 40 and 42. These commands result in creation of database transactions including the query and update (insert, delete and change) operations known in the art for database systems generally. Because either library manager 12 or library manager 14 is "active" at any particular time, dual database system 10 processes and stores all database transactions from one to the other on link 41.

System 10 maintains a database in each of the two library managers 12 and 14 with identical entries to provide redundancy for purposes of fault tolerance. Thus, system such as the IBM 3495 tape library server 10 can continue to operate when one database fails by using the remaining database. Another feature of this invention is that the system 10 can continue to perform database processing during the repair and recovery of a failed database. This feature is possible because the "active" database (for instance, the database in library manager 12) is copied one record at a time to the other database (e.g., the database in library manager 14) while interleaving incoming transactions into the operation stream. Such interleaved copying and updating is not feasible in the existing art because (1) queued copy operations displace incoming transactions and (2) errors encountered on update operations to the target database (in library manager 14) generate database system errors that require operation repetition and can halt the system. The method of this invention overcomes these problems (1) by introducing a copy operation queuing threshold technique to control interleaving and avoid "crowding out" of incoming transactions and (2) by ignoring requests for certain update operations in the redundant database during the database copying procedure.

Figure 2A:
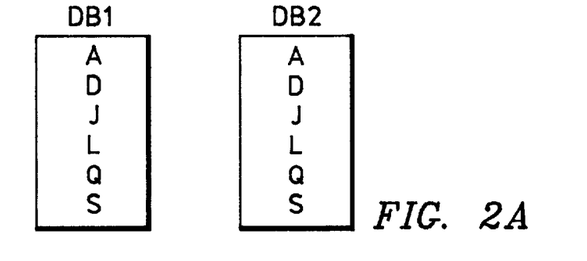
FIGS. 2A–2J illustrate an example of the recovery of a failed database using the method of this invention.

The method and system of this invention can be best understood by considering the illustrative example shown in FIGS. 2A–2J. The detailed features of each operational function of this invention are discussed hereinbelow in connection with FIGS. 3A–3D. In FIG. 2A, two databases, designated DB1 and DB2, are maintained by duplication of update operations in a dual database system such as system 10 in FIG. 1. DB1 and DB2 show the records ordered by a unique record identification key (RIK) for each record, exemplified by the alphabetical letters listed in FIG. 2A. For the purposes of this invention, the records need not be ordered by a key but must be uniquely identifiable by some RIK.

Figure 2B:
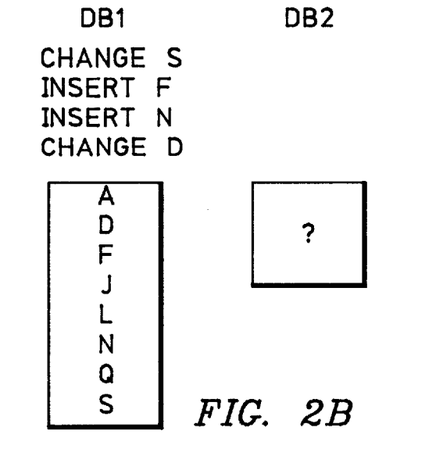

FIG. 2B shows the status of DB1 and DB2 after access to DB2 is lost for some reason. While DB2 access is lost, DB1 continues to process incoming transactions, as shown. Thus, DB1 changes (evolves into later consistent states) as DB2 is being repaired.

Figure 2C:
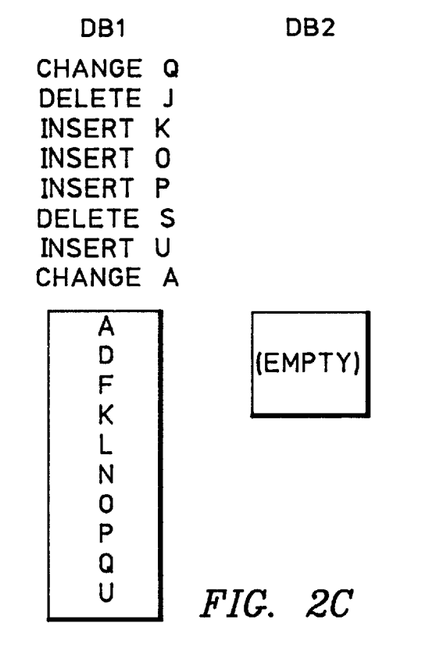
Figure 2D:
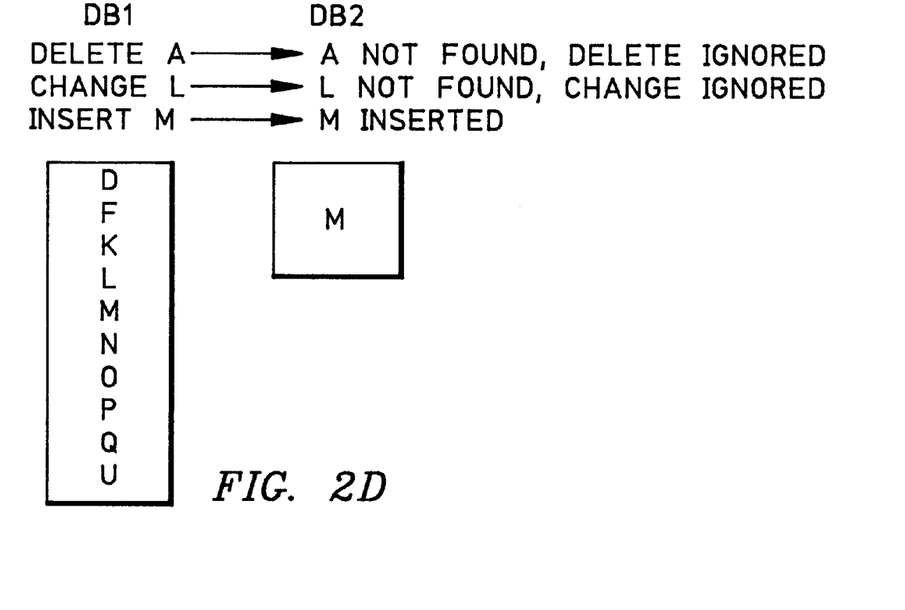

In FIG. 2C, DB1 continues to evolve because of incoming updates while DB2 access is recovered and DB2 is cleared of all records. This clearing operation is necessary to eliminate the inconsistent database recovered in DB2 following correction of the access fault. FIG. 2D shows the continuing evolution of DB1 as before, but also now shows the commencement of "echoing" of all incoming transactions in the second database DB2. The copying of DB1 to DB2 is not yet started but DB2 already includes record M inserted by an incoming update operation. According to this invention, during the database copying process, all update operations other than "insertions" are ignored in DB2 if the target record is not found therein and all "insertions" are ignored in DB2 if the target record is found already therein. By ignoring the "delete" and "change" operations in DB2 for nonexistent records, database processing error conditions are avoided that otherwise would force the repeat of the operation and eventually would halt processing.

Figure 2E:
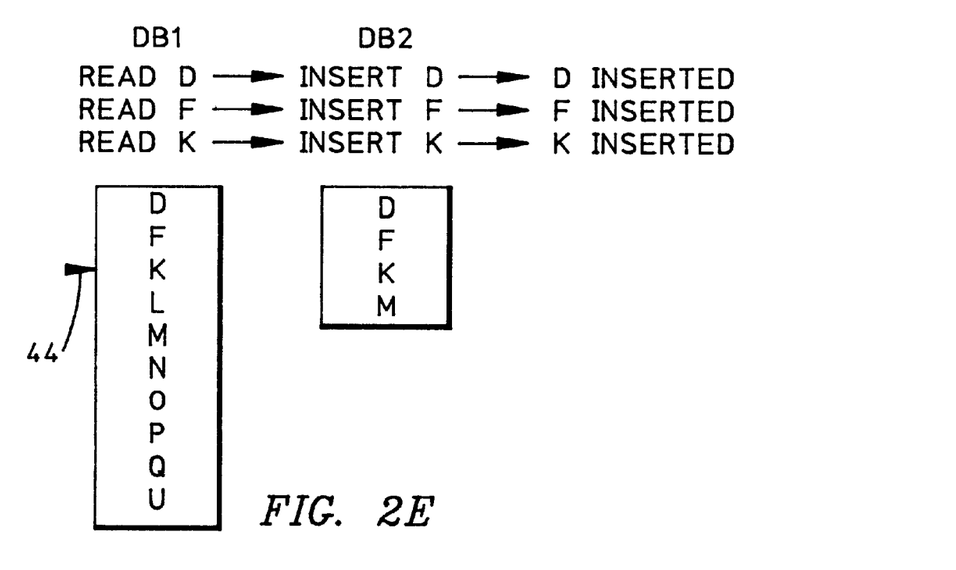

In FIG. 2E, the database copy procedure begins to copy records from DB1 to DB2. These copy operations are executed according to a dual incoming queue threshold test. The arrow indicator 44 indicates the last record read by the copy procedure. Although this copy procedure is illustrated as proceeding in RIK order through DB1, the method of this invention merely requires a single pass through the "active" database without regard for the order thereof. In FIG. 2E, three records D, F, and K are read in DB1 and inserted in DB2.

Figure 2F:
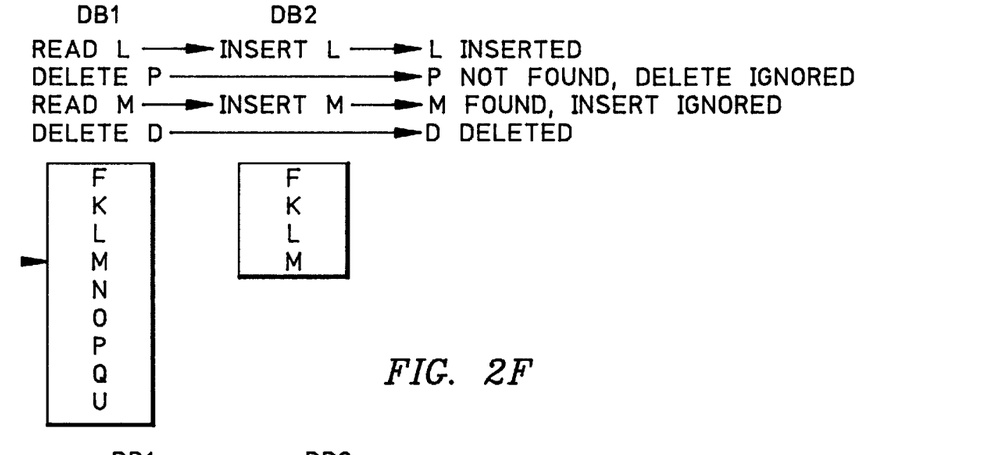

FIG. 2F shows the interleaving of the copy procedure operations with the incoming update operations. Record L is first copied from DB1 to DB2. Then an incoming delete operation deletes P from DB1. Because record P is not found in DB2, the "delete" operation is ignored, thereby avoiding a database error condition. Next, record M is copied from DB1 to DB2 and an incoming delete operation deletes record D from both DB1 and DB2. The priority of copy operation processing is determined by testing the queued incoming transactions against a dual threshold. The copy operations are slowed at the first threshold and halted at the second higher (longer incoming queue) threshold. Both thresholds are manually dictated by the user.

Figure 2G:
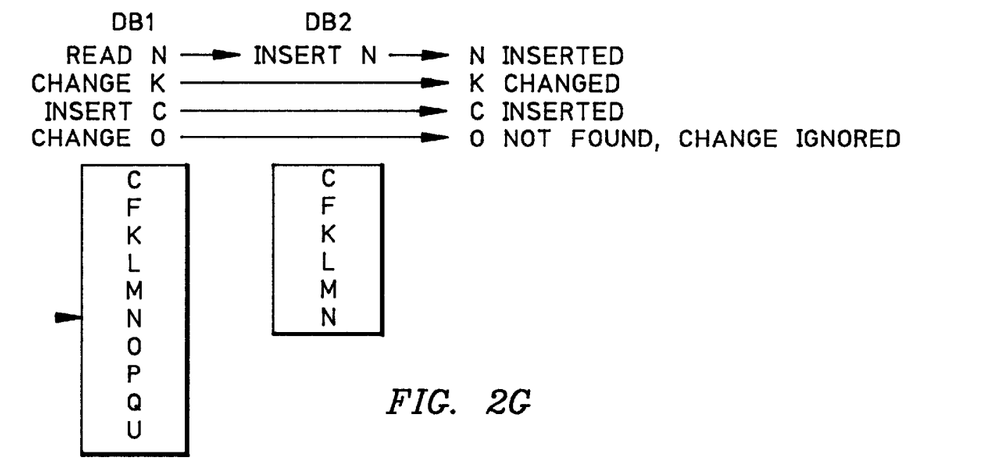

In FIG. 2G, the copy process continues, interleaved with incoming database update operations according to the threshold testing method of this invention. The incoming transactions are first queued. The queue is tested against the first threshold and, when the queue is long enough to cross the first threshold, the copy operations are throttled in favor of incoming operations until the incoming queue conditions improve. If the incoming queue continues to grow and crosses a second higher threshold, the copy operations are halted completely to allow the incoming queue to recover to a desirable level of concurrency.

Figure 2H:
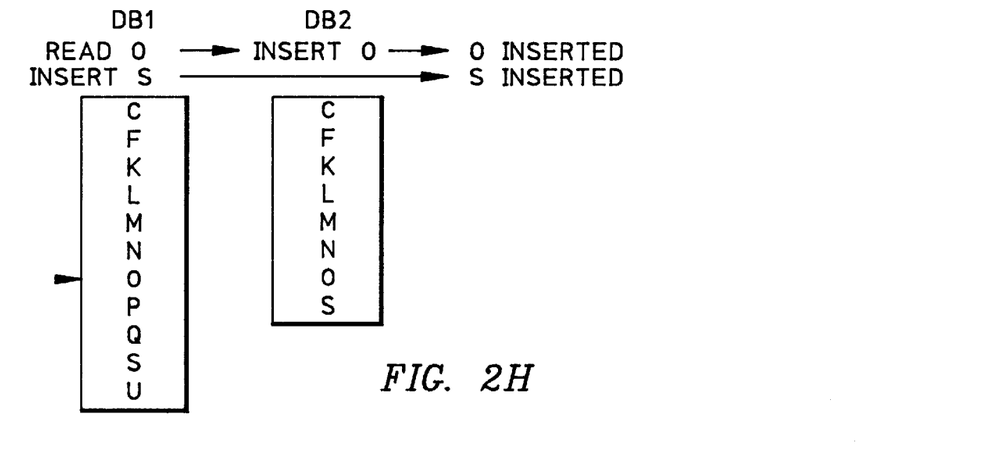
Figure 2I:
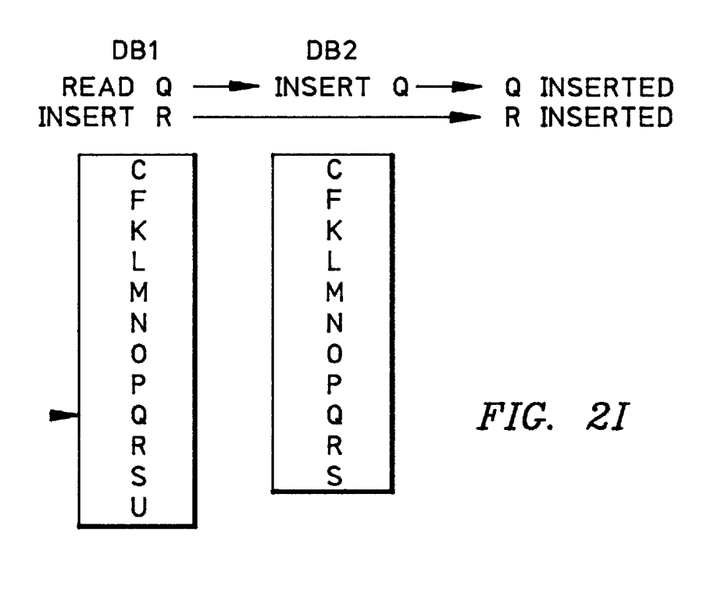
Figure 2J:
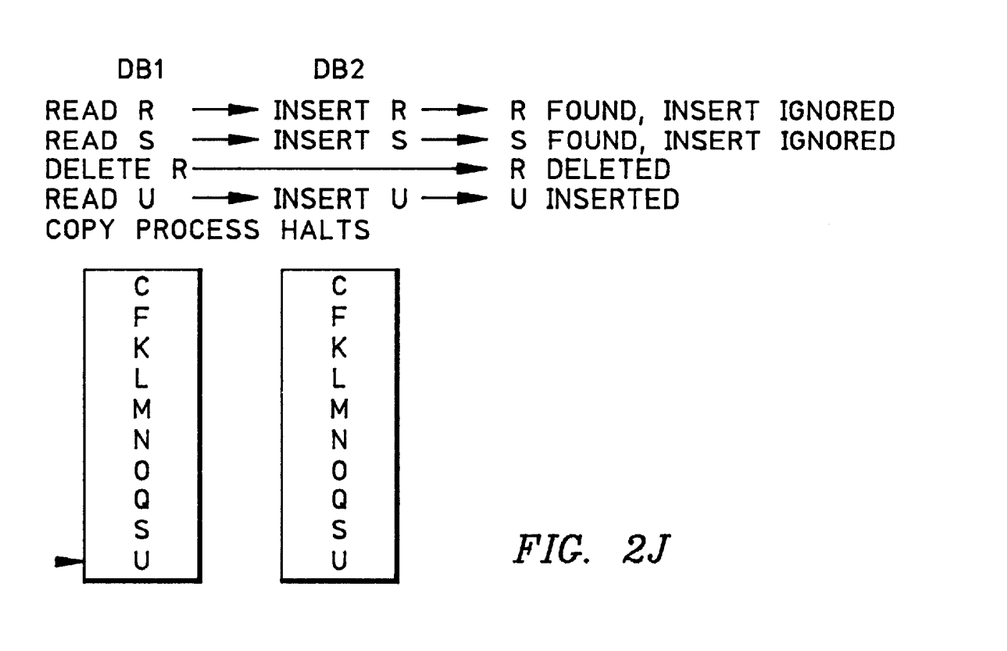

The process continues similarly through FIGS. 2H, 2I and finally completes in FIG. 2J. FIG. 2J shows databases DB1 and DB2 in synchronization after the single-pass copy process halts at record U. Because all incoming database update operations are echoed in DB2, both databases continue to be maintained in a consistent state. Because copy operations during recovery are appropriately throttled responsive to incoming activity levels, the "active" database is seamlessly available for servicing incoming transactions before, during and after recovery.

Note that the procedure of this invention does not require maintenance of a transaction log, requires no transaction rollback nor application of logged transactions to an earlier consistent database. However, it is preferred that a temporary transaction log (not shown) be maintained during the "downtime" of DB2 to ensure database recovery in the event that database DB1 fails while database DB2 is down.

Figure 3A:
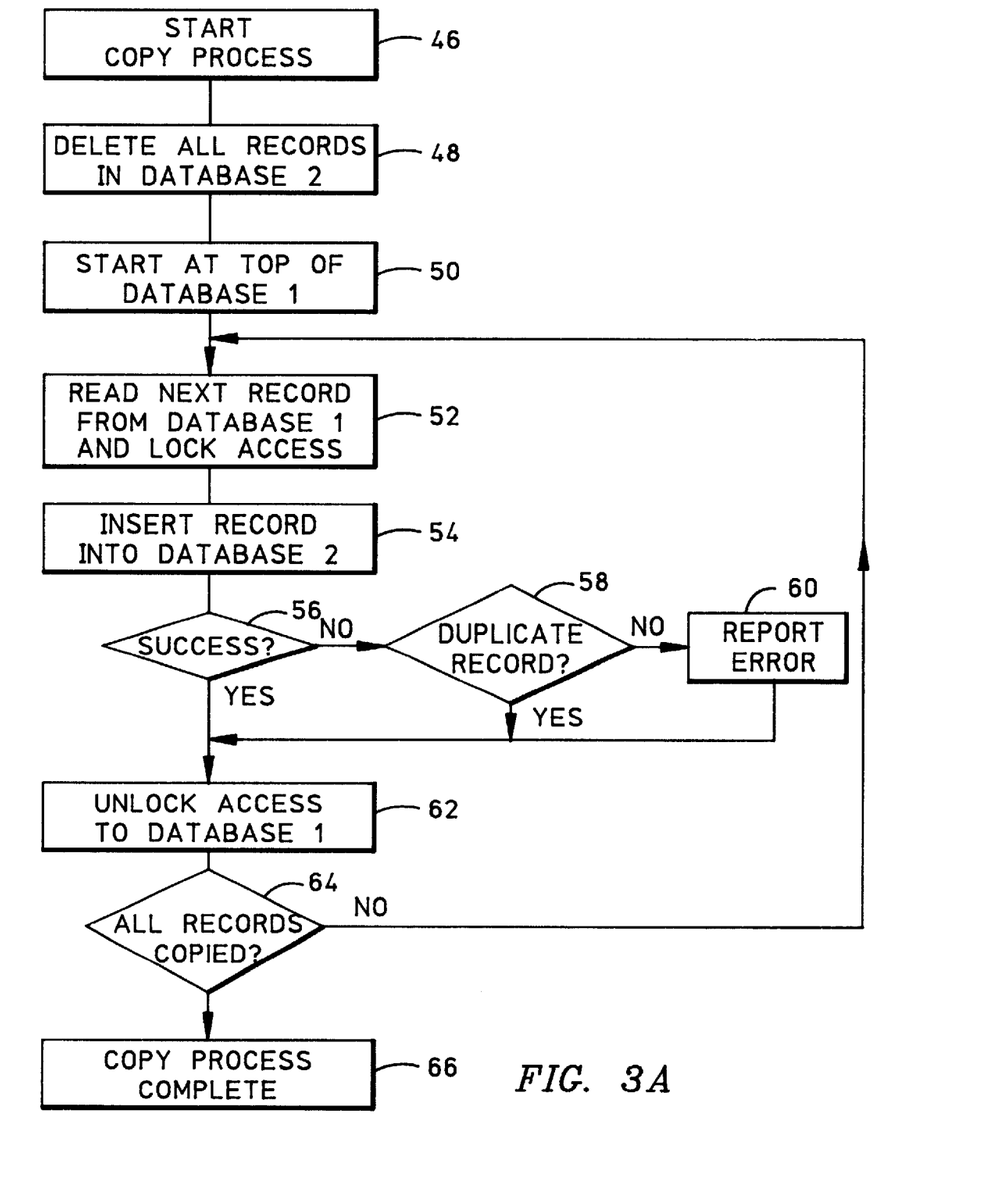
FIGS. 3A–3D provide functional block diagrams illustrating the elementary procedures of the method of this invention.

FIGS. 3A–3D provide functional block diagrams illustrating each of the four special procedures illustrated above in connection with the examples shown in FIGS. 2A–2J. FIG. 3A shows the database copy process of this invention, which starts at step 46. Step 48 deletes all records in the inconsistent database DB2. Step 50 begins at top of DB1 and proceeds through DB1 in a single pass, the order of which is arbitrary. Each record is first locked and read from DB1 in step 52. Subject to the above-described queue arbitration (not shown), the record is then inserted in DB2 at step 54. Following insertion, step 56 tests for successful completion of the insertion operation. If the insertion fails, step 58 then tests for the presence in DB2 of a record having the same RIK as the record read from DB1 in step 52. If such a record does not already exist in DB2, then step 60 reports a database system error to the appropriate monitoring system. If the duplicate record already exists in DB2, step 60 is bypassed and control is returned to step 62, which then removes the record lock placed in DB1 at step 52. After unlocking, step 64 tests for the end of the pass and returns to step 52 if uncopied records remain in DB1. If step 64 shows all records to have been copied, the copy process exits at step 66.

Figure 3B:
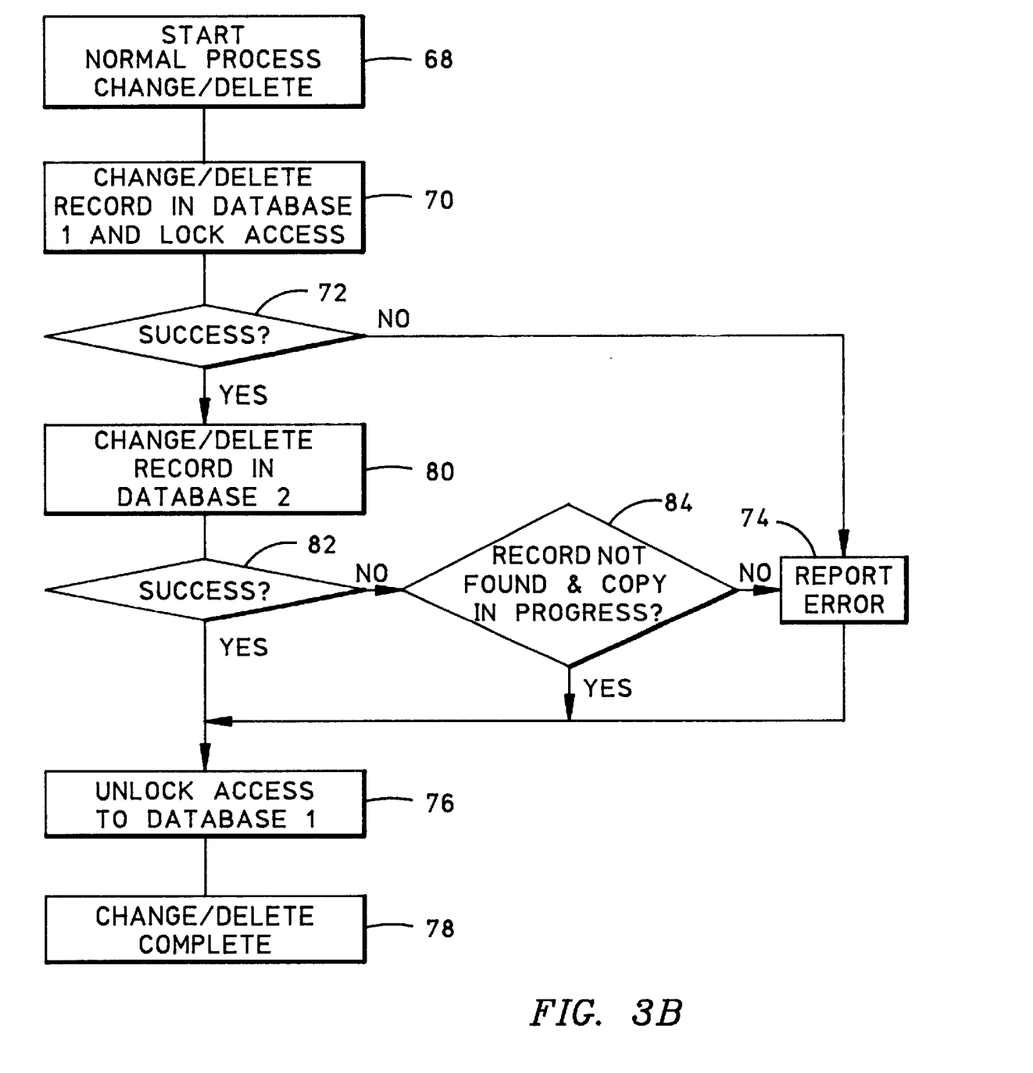

FIG. 3B provides the details of the normal incoming change or delete operation processing, which starts at step 68. In step 70, the target record is changed or deleted in DB1, which is then locked. After locking, step 72 tests for successful completion of the change or delete operation and error is reported to the appropriate monitor in step 74 if the operation failed. After error reporting, process control is handed to step 76, which unlocks DB1 and exits the normal process at step 78. Thus, failure of a change or delete operation in DB1 causes the bypass of the "echoing" of this operation in DB2 at step 80. If step 70 succeeds, only then is step 80 executed, thereby updating the same record in DB2. Step 82 then tests for the success of the echoed operation. If step 82 is unsuccessful, step 84 then tests DB2 to determine if (a) the subject record is not present in DB2 and (b) a database copy operation is in progress. If these conditions are not met, step 74 is executed to report the error. If step 84 finds that the record is not present and a copy is in progress, the error reporting step 74 is bypassed and control is returned to step 76, which unlocks the DB1 record and exits at step 78.

Figure 3C:
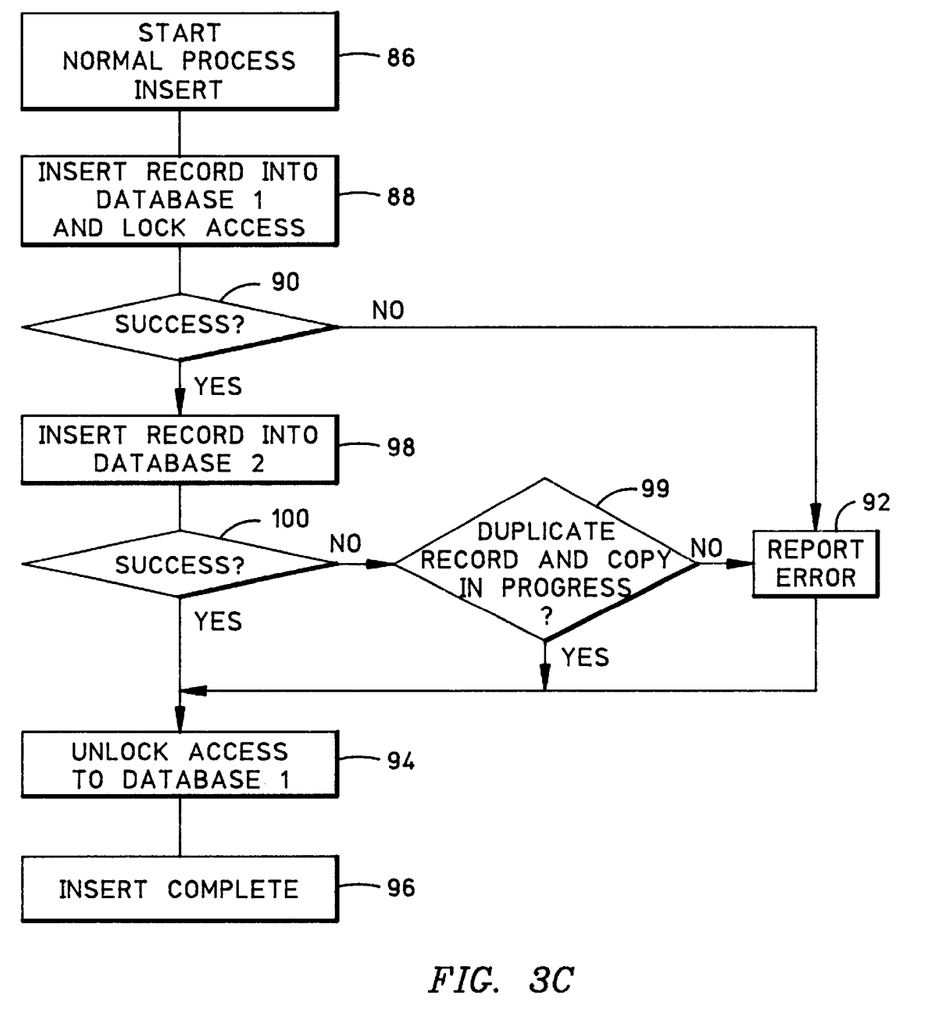

FIG. 3C shows the details of the normal incoming insert operation procedure, which starts at step 86. Step 88 inserts the record into DB1 and locks access thereto. Step 90 then tests for successful completion of step 88 and reports the error at step 92 when step 88 fails to properly complete. After reporting the error, DB1 is unlocked at step 94 and the process exits at step 96. If step 88 completes successfully, then step 90 hands control to step 98, which "echoes" the insertion operation at DB2. Step 100 then tests for successful completion of step 98 and tests for a duplicate record condition during copying at step 99. If step 99 fails, the process reports an error at step 92.

Figure 3D:
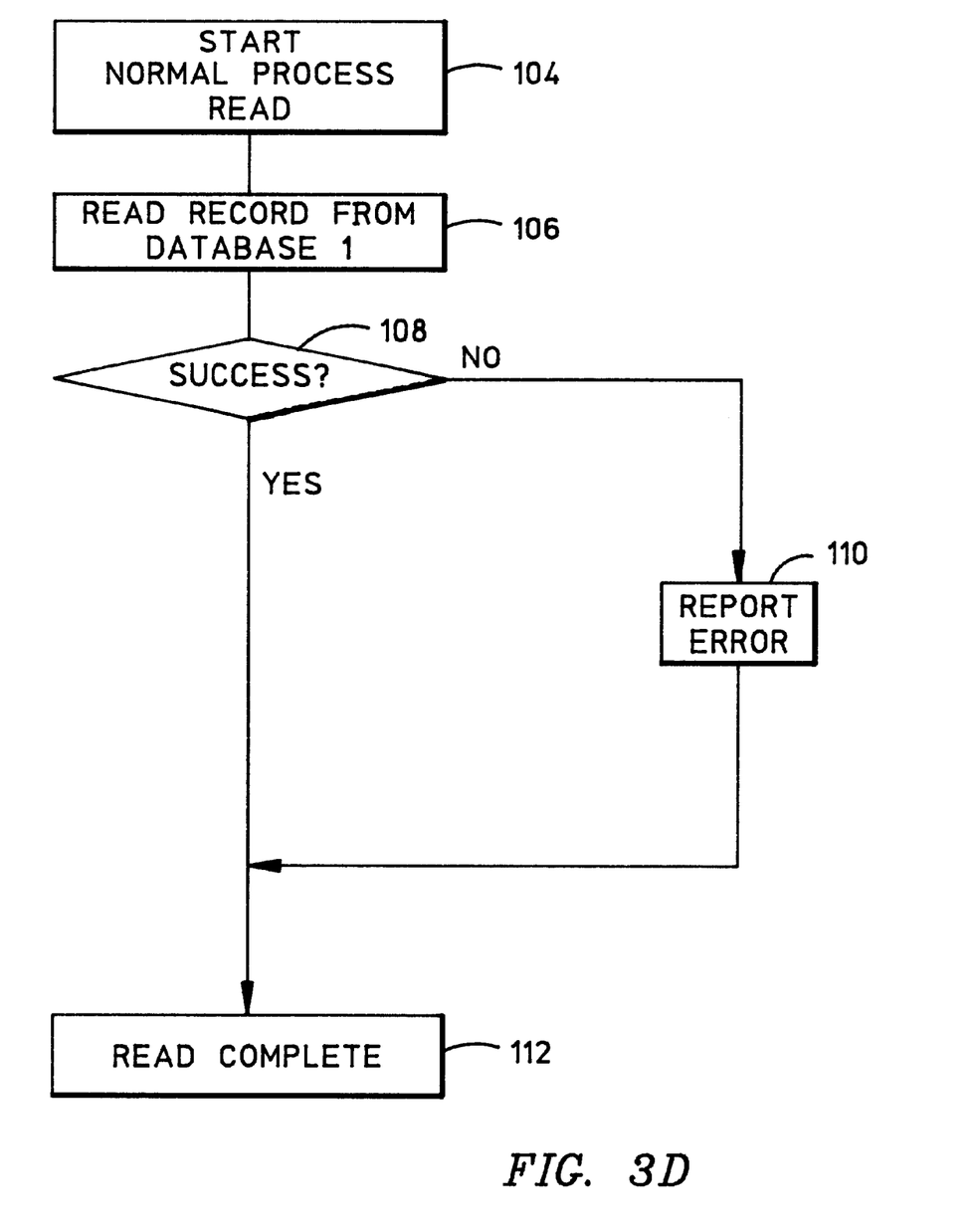

FIG. 3D shows the normal record reading process, which starts at step 104. Because records are read only from the "active" database in the dual database system of this invention, step 106 reads the record from DB1, which is the "active" one of the two. Step 108 then tests for successful completion of step 106 and reports error at step 110 where appropriate. Whether step 106 completes successfully or not, the read process exits at step 112 substantially as shown.

Because the dual database system of this invention provides two databases, either may be designated as "active", but not both. For instance, the two exemplary library managers (FIG. 1) must negotiate for active status at startup and following recovery from a failure. According to this invention, when one database becomes unusable because of a system fault, the other is designated "active" and all operations are performed on the single "active" database until recovery of the failed database. Following recovery, the "active" database remains active. If the "active" database fails, the "redundant" or "backup" switches to "active" status and continues operating during the repair and recovery process.

Figure 4A:
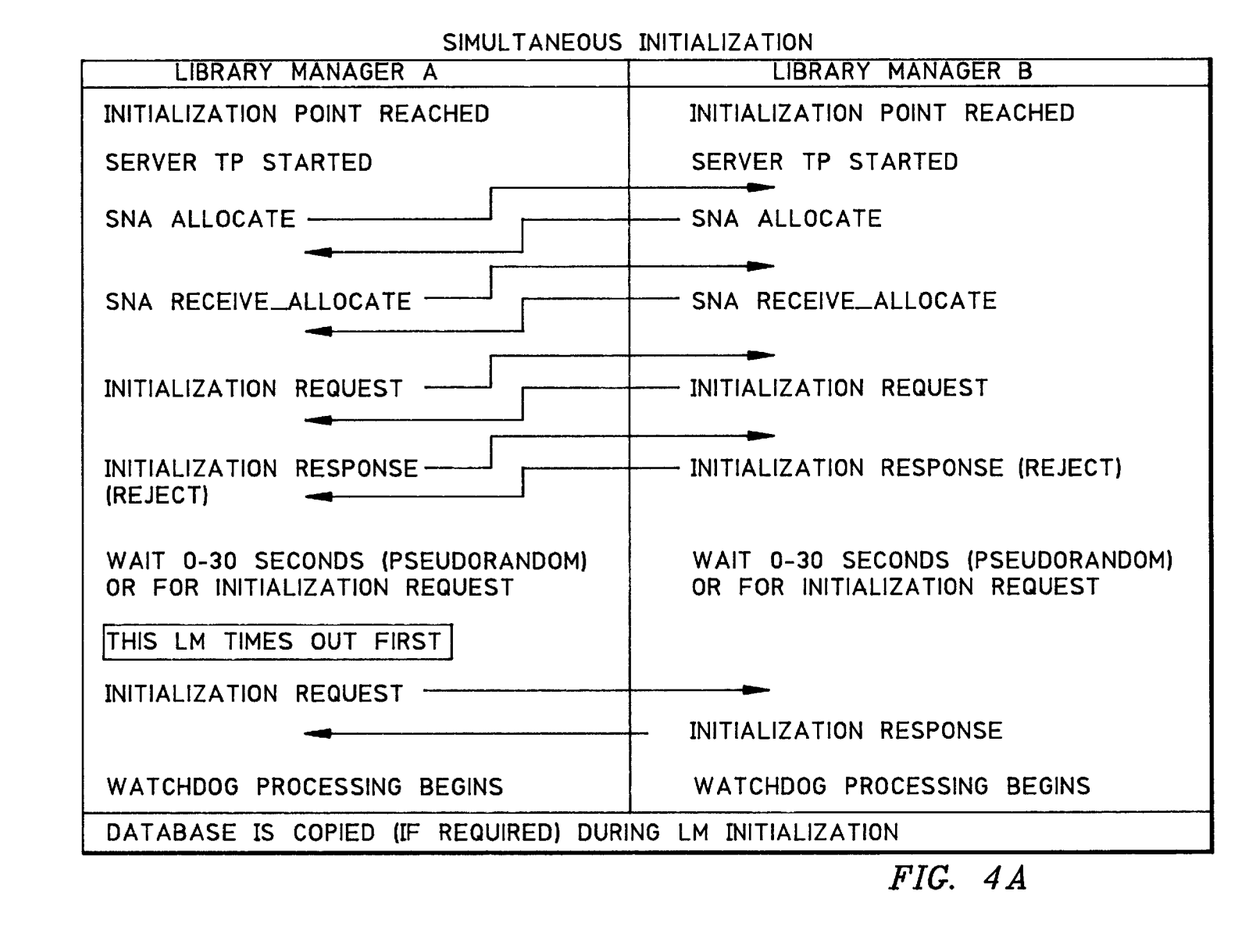
FIGS. 4A–4C provide diagrams showing exemplary initialization procedures applicable to the system of FIG. 1.
Figure 4B:
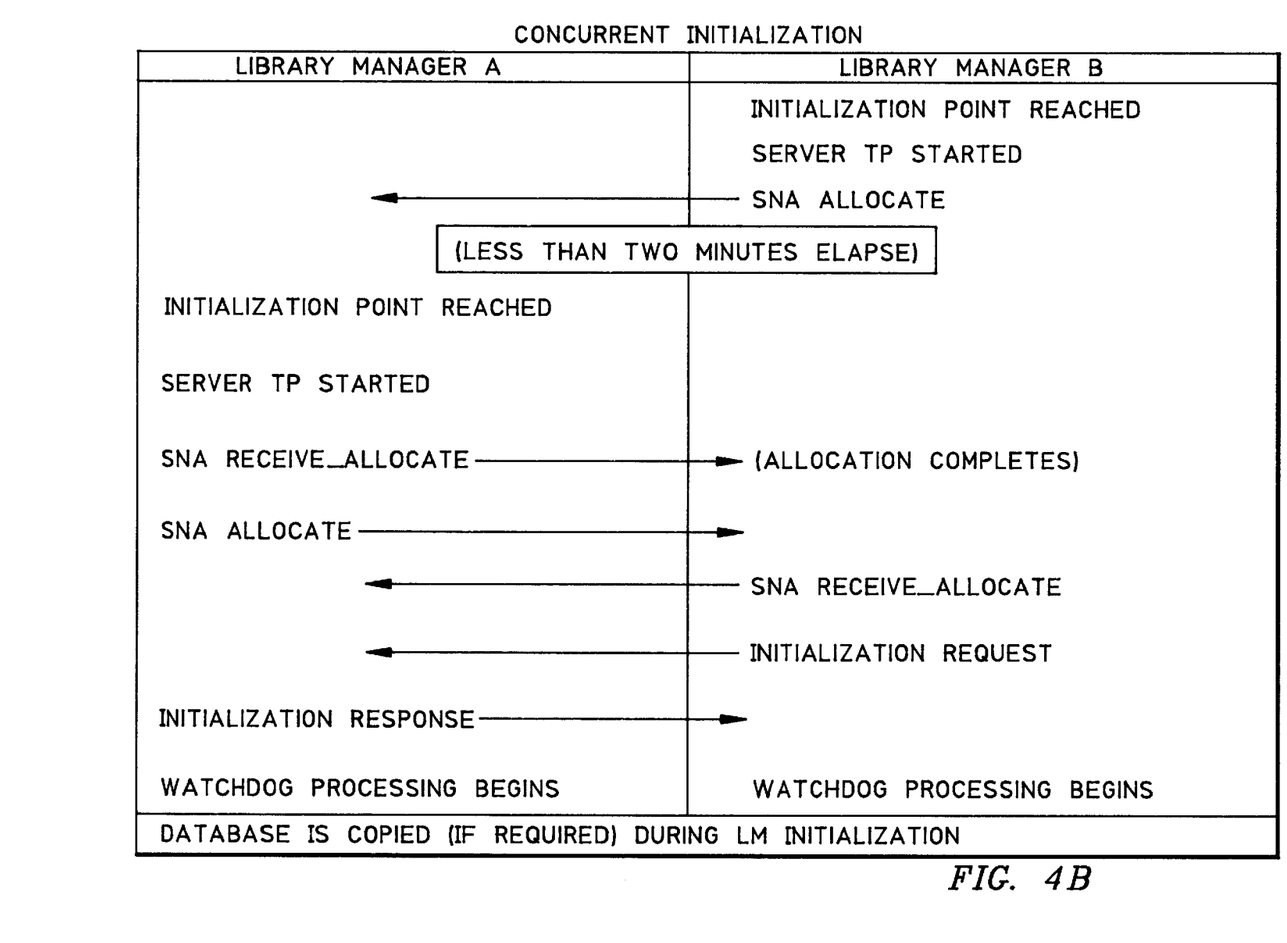
Figure 4C:
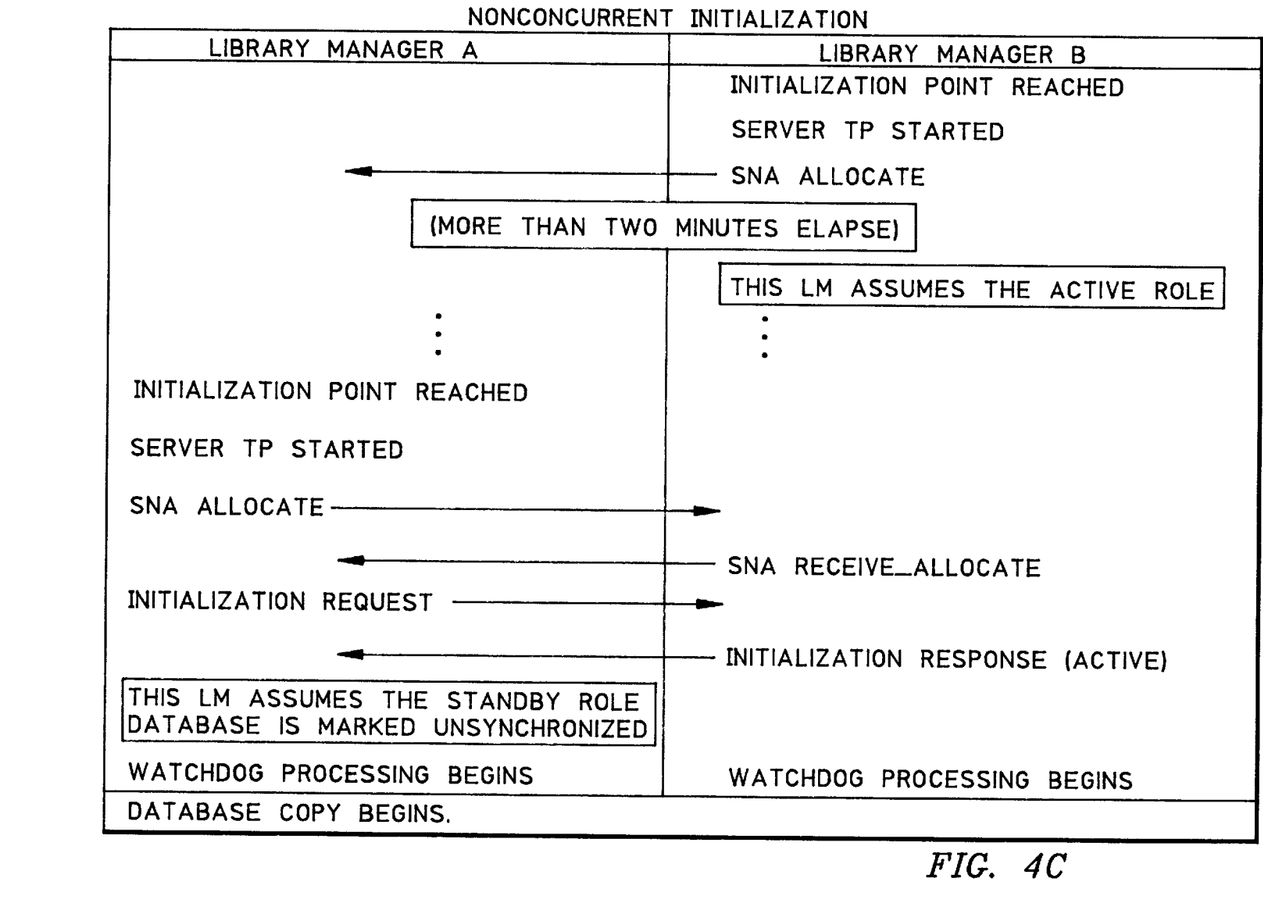

FIGS. 4A–4C illustrate the procedure of this invention for negotiating active status during and following system initialization. Library managers A and B must agree on roles in several situations. The active or backup role of each library manager is determined primarily by database timestamps sent in Initialization Request and Response messages. The timestamp information gives to each library manager the last times that each database was updated. Since the timestamps are coordinated during concurrent operation, any difference in timestamps indicates inconsistency of the databases. The library manager with the most recently-updated database then becomes "active" and the other becomes "backup".

When the timestamps match, the roles are determined by a preference stored in each library manager. This preference is stored in each library manager in the microcode. Such preference might be then overridden by an environment variable or by the user. FIG. 4A illustrates the effect of this preference on active status with simultaneous timecode stamps.

In FIG. 4A, server TP is started simultaneously and the SNA-allocate communications are initiated to one another simultaneously. Responsive to the SNA-allocate signals, the SNA receive_allocates signals are returned simultaneously, followed by simultaneous initialization request signals substantially as shown. Because the requests are simultaneous, both library managers A and B respond by rejecting the initialization requests from the other. At this point a pseudorandom wait time interval is established in both managers. Because this wait interval is selected randomly to be between 0 and 30 seconds, one of the library managers must wait longer than the other. In FIG. 4A, the active and backup roles are determined by the timestamp information in the request and response. In the case of a tie, the preference setting is used to determine the roles. After this negotiation is completed, the "watchdog" processing begins in both library managers A and B. If necessary, such as when the system is initialized from some failure, the "active" database is then copied directly to the backup or "redundant" database during the initialization process.

In FIG. 4B, the two library managers reach the initialization point less than two minutes apart. Because it powered-up first, library manager B first requests initialization and assumes "active" status because of the negotiations discussed above. Watchdog processing then begins and the "active" database is copied only if necessary.

In FIG. 4C, initialization of library manager A is delayed for more than two minutes with respect to initialization of library manager B, which then assumes the "active" role as a single database. Because library manager A is not available, library manager B proceeds to process incoming database transactions while awaiting "recovery" of library manager A. After library manager A comes online, library manager B asserts its existing "active" status when queried by an initialization request from library manager A, which then defers and assumes the standby role as an unsynchronized backup database. After starting watchdog processing, the database copy process (FIG. 3A) starts so that the unsynchronized database in library manager A can be recovered to a concurrent state. This method uses a third component (not shown) as a "referee" to ensure that the "active" database is valid. Both library managers are connected to this third component, which maintains system status information. When a library manager initializes and the other is unavailable, it tests the stored information from the referee to determine if it has a useable database. If useable, the inquiring library manager assumes the active role. If not, it assumes the "backup" role and waits for the other library manager to initialize and assume the active role.

Clearly, other embodiments and modifications of this invention will occur readily to those of ordinary skill in the art in view of these teachings. Therefore, this invention is to be limited by the following claims which include all such embodiments and modifications when viewed in conjunction with the above specification and accompanying drawing.

I claim:

1. In a transaction processing system including first and second database systems for processing queries and updates, each said database system having a database in which are stored a plurality of records, each having an unique Record Identification Key (RIK), wherein said second database system database is a replica of said first database system database, a method for recovering from failure of said second database system, said method comprising the steps of:

(a) repairing said failure and restarting operation of said second database system;
   (b) deleting all said records from said second database system database; and
   (c) recreating said second database system database by performing the interleaved steps of
      (c.1) processing in both said first and said second database system each said update as it occurs and processing only in said first database system each said query as it occurs, and
      (c.2) copying each said record from said first database system database to said second database system database.

2. The method of claim 1 wherein said copying step (c.2) comprises the steps of:

(c.2.1) ordering said records according to an ordering rule; and
   (c.2.2) performing once for each said record in said record order the steps of
      (c.2.2.1) locking said each record in said first database system database to prevent changes resulting from concurrent performance of said processing step (c.1),
      (c.2.2.2) reading said each locked record in said first database system database,
      (c.2.2.3) inserting said each locked record into said second database system database, and
      (c.2.2.4) unlocking said each locked record in said first database system database.

3. The method of claim 2 wherein said copying step (c.2) is performed for each said record in a single pass in RIK order through said first database system database.

4. The method of claim 3 wherein said recreating step (c) further comprises the steps of:
- (c.3) ignoring in said second database system each said update requiring the deletion or change of a record having a RIK that is not already represented by a record in said second database system database; and
- (c.4) ignoring in said second database system each said update requiring the insertion of a record having a RIK that is already represented by a record in said second database system database.

5. The method of claim 1 wherein said recreating step (c) further comprises the steps of:
- (c.3) ignoring in said second database system each said update requiring the deletion or change of a record having a RIK that is not already represented by a record in said second database system database; and
- (c.4) ignoring in said second database system each said update requiring the insertion of a record having a RIK that is already represented by a record in said second database system database.

6. A fault-tolerant transaction processing system comprising:
- input means for accepting queries and updates;
- active database system means coupled to said input means for processing said queries and updates as they are accepted;
- redundant database system means coupled to said input means for processing said updates concurrently with the operation of said active database system means;
- an active database in said active database system means for storing a plurality of records each having a unique Record Identification Key (RIK);
- a redundant database in said redundant database system means for storing a plurality of said records wherein said redundant database is a replica of said active database; and
- concurrent recovery means coupled to said active database system means and to said redundant database system means for recreating said redundant database concurrently with continuing operation of said active database system means.

7. The system of claim 6 further comprising:
- database clearing means in said concurrent recovery means for deleting all records from said redundant database concurrently with operation of said active database system means; and
- record copying means in said concurrent recovery means for copying records from said active database to said redundant database concurrently with operation of said active database system means.

8. The system of claim 7 further comprising:
- reassignment means coupled to said active database system means and to said redundant database system means for reassigning said queries to said redundant database system means responsive to failure of said active database system means, whereby said redundant database system means becomes the active database system means.

9. The system of claim 8 wherein said record copying means comprises:
- locking means for locking at least one said record in said active database to prevent changes resulting from concurrent performance of said updates by said active database system means;
- reading means for reading said locked record in said active database; and
- insertion means for inserting a copy of said locked record into said redundant database.

10. The system of claim 9 wherein said concurrent recovery means comprises:
- error bypass means for ignoring each said update that either inserts a record having a RIK that is already represented by a record present in said redundant database or changes or deletes a record having a RIK that is not already represented by a record in said redundant database.

11. The system of claim 6 wherein said concurrent recovery means comprises:
- error bypass means for ignoring each said update that either inserts a record having a RIK that is already represented by a record present in said redundant database or changes or deletes a record having a RIK that is not already represented by a record in said redundant database.

12. In a transaction processing system including first and second database systems for processing queries and updates, said database systems having first and second databases, respectively, in which are stored a plurality of records, each having an unique Record Identification Key (RIK), wherein said second database is a replica of said first database, a method for recovering from failure of said second database system, said method comprising the steps of:
- (a) repairing said failure and restarting operation of said second database system;
- (b) deleting all said records from said second database;
  - (b1) receiving new records for addition to the plurality of records in the first and second databases;
  - (b2) receiving updates to specified ones of said plurality of records, each said update comprising a change to a specified one of said plurality of records;
  - (b3) receiving queries of said plurality of records, each of said queries comprising a request to read a designated record from the databases;
- (c) recreating said second database by performing the interleaved steps of:
  - (c.1) storing in both said first and said second databases each said new record upon receipt,
    performing each update by (1) changing the specified existing record in the first database and (2) changing the specified existing record in the second database if the specified record exists there,
    processing each of said queries by reading the specified record only from said first database, and
  - (c.2) copying from said first database to said second database each record of said plurality of records present in said first database but not present in said second database.

13. The method of claim 12 wherein said copying step (c.2) comprises the steps of:
- (c.2.1) ordering records of said plurality of records present in said first database but not in said second database according to an ordering rule; and
- (c.2.2) performing once for each said record in said record order the steps of
  - (c.2.2.1) locking said each record in said first database to prevent changes resulting from concurrent performance of said processing step (c.1),
  - (c.2.2.2) reading said each locked record in said first database,
  - (c.2.2.3) inserting said each locked record into said second database, and
  - (c.2.2.4) unlocking said each locked record in said first database.

14. The method of claim 13 wherein said copying step (c.2) is performed for each said record in a single pass in RIK order through said first database.

15. The method of claim 14 wherein said recreating step (c) comprises the steps of:
 (c.3) ignoring in said second database system each said update requiring the deletion or change of a record having a RIK that is not already represented by a record in said second database; and
 (c.4) ignoring in said second database system each said update requiring the insertion of a record having a RIK that is already represented by a record in said second database.

16. The method of claim 12 wherein said recreating step (c) comprises the steps of:
 (c.3) ignoring in said second database system each said update requiring the deletion or change of a record having a RIK that is not already represented by a record in said second database; and
 (c.4) ignoring in said second database system each said update requiring the insertion of a record having a RIK that is already represented by a record in said second database.

17. A fault-tolerant transaction processing system comprising:
 input means for accepting queries and for accepting updates to specified records;
 active database system means coupled to said input means for processing said queries and updates as they are accepted;
 redundant database system means coupled to said input means for processing said updates concurrently with the operation of said active database system means;
 an active database in said active database system means for storing a plurality of records each having a unique Record Identification Key (RIK);
 a redundant database in said redundant database system means for storing a plurality of said records wherein said redundant database is a replica of said active database; and
 concurrent recovery means coupled to said active database system means and to said redundant database system means, said concurrent recovery means being programmed for recreating said redundant database concurrently with continuing operation of said active database system means by:
  storing in both said active and said redundant databases new records upon receipt thereof,
  effecting each update by (1) changing a specified record in the active database and (2) changing the specified record in the redundant database if the specified record exists there,
  processing each query by reading records only from said active database, and
  copying from said active database to said redundant database all records present in said active database but not present in said redundant database.

18. The system of claim 17, said concurrent recovery means comprising:
 database clearing means for deleting all records from said redundant database concurrently with operation of said active database system means; and
 record copying means for copying records from said active database to said redundant database concurrently with operation of said active database system means.

19. The system of claim 18, said concurrent recovery means comprising:
 reassignment means coupled to said active database system means and to said redundant database system means for reassigning said queries to said redundant database system means responsive to failure of said active database system means, whereby said redundant database system means becomes the active database system means.

20. The system of claim 19 wherein said record copying means comprises:
 locking means for locking at least one said record in said active database to prevent changes resulting from concurrent performance of said updates by said active database system means;
 reading means for reading said locked record in said active database; and
 insertion means for inserting a copy of said locked record into said redundant database.

21. The system of claim 20 wherein said concurrent recovery means comprises:
 error bypass means for ignoring each said update that either inserts a record having a RIK that is already represented by a record present in said redundant database or changes or deletes a record having a RIK that is not already represented by a record in said redundant database.

22. The system of claim 17 wherein said concurrent recovery means comprises:
 error bypass means for ignoring each said update that either inserts a record having a RIK that is already represented by a record present in said redundant database or changes or deletes a record having a RIK that is not already represented by a record in said redundant database.

23. A failure recovery method for use in a transaction processing system including first and second databases for processing queries and updates, each of said databases containing a plurality of records, wherein the second database is a replica of the first database, said method being for recovering from failure of the second database and comprising the steps of:
 (a) repairing the failure of the second database and restarting operation of said second database;
 (b) deleting all said records from the second database;
 (c) receiving new records for addition to the plurality of records in the first and second databases;
 (d) receiving updates to specified ones of said plurality of records, each said update comprising a change to a specified existing one of said plurality of records;
 (e) receiving queries of said plurality of records, each of said queries comprising a request to read a designated record from the databases;
 (f) recreating said second database by performing steps comprising:
  (g) storing in both the first and said second databases each said new record upon receipt,
  (h) performing each update by:
   (1) changing the specified existing record in the first database,
   (2) determining whether as a result of the storing step the specified existing record resides in the second database, and if so, changing the specified existing record in the second database,
  (i) processing each of said queries by reading the specified record only from said first database, and
  (j) interleaved with steps (g), (h), and (i), copying from said first database to said second database each record of said plurality of records present in said first database but not present in said second database.

* * * * *